(12) United States Patent
Pucher et al.

(10) Patent No.: US 8,359,764 B2
(45) Date of Patent: Jan. 29, 2013

(54) MOUNT FOR A SCALE

(75) Inventors: Wolfgang Pucher, Bergen (DE); Ernst Thielicke, Tittmoning (DE); Reinhard Mayer, Traunstein (DE); Kilian Bauer, Traunreut (DE); Karl Fiedler, Siegsdorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 1331 days.

(21) Appl. No.: 12/001,201

(22) Filed: Dec. 10, 2007

(65) Prior Publication Data

US 2008/0191107 A1 Aug. 14, 2008

(30) Foreign Application Priority Data

Jun. 11, 2005 (DE) .......................... 10 2005 027 025
Mar. 17, 2006 (WO) ................. PCT/EP2006/002486

(51) Int. Cl.
*G01B 5/00* (2006.01)
*F16M 13/00* (2006.01)

(52) U.S. Cl. ....... 33/702; 248/689; 248/316.7; 248/584; 248/201

(58) Field of Classification Search .................. 248/901, 248/316.7, 229.16, 468, 689, 346.06, 542, 248/584, 201; 33/702, 704, 706–708; 29/525.01, 29/525.02; 177/DIG. 9
See application file for complete search history.

(56) References Cited

U.S. PATENT DOCUMENTS

| 4,549,354 | A | | 10/1985 | Affa et al. | |
|---|---|---|---|---|---|
| 4,776,098 | A | * | 10/1988 | Nelle | 33/702 |
| 4,777,728 | A | | 10/1988 | Ludicke | |
| 5,375,338 | A | | 12/1994 | Nelle | |
| 6,571,486 | B1 | * | 6/2003 | Tondorf et al. | 33/706 |
| 2003/0056387 | A1 | | 3/2003 | Kawada | |
| 2006/0016089 | A1 | * | 1/2006 | Kawada et al. | 33/706 |

FOREIGN PATENT DOCUMENTS

DE 36 06 754 A1 11/1986

* cited by examiner

*Primary Examiner* — Terrell McKinnon
*Assistant Examiner* — Ingrid M Weinhold
(74) *Attorney, Agent, or Firm* — Brinks Hofer Gilson & Lione (57) ABSTRACT

A holding device for a scale including a support body, a first solid body link and a second body link. The first solid body link acts as a connection between a first longitudinal side of a scale and the support body, via which the scale can be seated, shiftable in a measuring direction, on the support body. The second solid body link acts as a connection between a second longitudinal side of the scale and the support body, via which the scale can be seated, shiftable in the measuring direction, on the support body, wherein the second longitudinal side and the first longitudinal side are arranged opposite each other.

27 Claims, 13 Drawing Sheets

MOUNT FOR A SCALE

RELATED APPLICATIONS

Applicants claim, under 35 U.S.C. §120, the benefit of priority of the filing date of Mar. 17, 2006 of Patent Cooperation Treaty patent application no. PCT/EP20006/002486, filed on the aforementioned date, the entire contents of which are incorporated herein by reference.

Applicants claim, under 35 U.S.C. §119, the benefit of priority of the filing date of Jun. 11, 2005 of a German patent application, copy attached, Serial Number 10 2005 027 025.5, filed on the aforementioned date, the entire contents of which is incorporated herein by reference.

BACKGROUND

1. Technical Field

The present invention relates to a holding device for a scale.

2. Background Information

Such a holding device for a scale of a longitudinal measuring arrangement is described in DE 36 06 754 A1. The holding device includes a support body, on which a plurality of support sections, which can be resiliently deflected in the measuring direction, are arranged. The scale is fastened with one of its longitudinal sides on these support sections. Fastening is provided by gluing, cementing or screwing.

This procedure has the disadvantage that in case of a longitudinal extension of the support body and the scale caused by a temperature change, longitudinal forces act unilaterally on the scale and cause bending of the scale.

OBJECTS AND SUMMARY OF THE INVENTION

An object of the present invention is therefore based on disclosing a holding device for a scale with which bending of the scale can be averted.

This object is attained by a holding device for a scale including a support body, a first solid body link and a second solid body link. The first solid body link acts as a connection between a first longitudinal side of a scale and the support body, via which the scale can be seated, shiftable in a measuring direction, on the support body. The second solid body link acts as a connection between a second longitudinal side of the scale and the support body, via which the scale can be seated, shiftable in the measuring direction, on the support body, wherein the second longitudinal side and the first longitudinal side are arranged opposite each other.

The holding device in accordance with the present invention has the advantage that asymmetrical longitudinal forces are avoided. Distortions of a scale because of transverse forces resulting from the different thermal longitudinal extension of the scale and its support body, as well as from the manner of its fastening, are at least mostly avoided. Frictional effects are avoided by the use of solid body links and it is assured that, following a temperature compensation, the scale returns into its initial position in a reproducible manner. The longitudinal extension of the support body relative to the scale can be realized by solid body links which are simple to reproduce, and the forces acting on the scale because of the deflection of the solid body links do not lead to bending of the scale.

A solid body link (flexure) is an adhesion-free and sliding friction-free element based on the elastic deformation, or bending of a solid body, which does not require rolling or sliding parts at all. Advantages of solid body links are freedom from wear, indifference to shock stresses and vibrations. Solid body links are adhesion-free, roll-free and sliding friction-free and therefore do not require any lubricants.

An introduction of transverse forces into the scale is prevented by the symmetrical arrangement of the solid body links in relation to the center of the scale, and in that the bending properties of respectively oppositely located solid body links are made identical by the selection of identical lengths of the strips, the same cross sections of the strips and the same materials.

Very good results can be achieved if a leaf spring parallelogram device is used as the solid body link.

Measures are provided which prevent a displacement of the scale in the Y-direction, or the introduction of impermissible forces into the scale in the Y-direction, caused by the deflection of the solid body links. It is therefore possible to completely prevent a shortening of the spring strips, caused by the deflection of the solid body links, and therefore a transverse force, or a movement of the fastening element and the scale fastened thereon in the Y-direction, if a double-spring parallelogram device, also called a multi-link flexure guidance system, is employed. In this double-spring parallelogram device the respective shortening of one leaf spring is compensated by parallel arrangement with a further leaf spring.

A compensating element is alternatively or additionally arranged between the support body and the scale, which seats the fastening element, or at least the stop face cooperating with one longitudinal side of the scale, so it is movable in a direction Y perpendicularly to the measuring direction X. In particular, this compensating element is resiliently embodied and by a force component Y clamps the scale on its longitudinal sides perpendicularly with respect to the measuring direction X. Furthermore, the compensating element compensates movements in a direction Y perpendicularly with respect to the measuring direction X, caused by deflection of the solid body links, so that in case of a deflection of the solid body links in the X-direction, the scale is not displaced in the Y-direction because of the shortening of the strips of the solid body link occurring in the course of this. In particular, this compensating element is embodied as a solid body link acting in the Y-direction, which seats at least the stop face of the fastening element cooperating with the scale in an elastically deflectable manner on the solid body link acting in the X-direction. So as not to introduce a movement of the stop face in the X-direction in the course of this deflection in the Y-direction, it is designed, for example, as a symmetrically arranged extension element.

Further advantages, as well as details of the present invention, ensue from the following description of exemplary embodiments by the attached drawing figures.

DETAILED DESCRIPTION OF THE PREFERRED EMBODIMENTS

Figure 1:
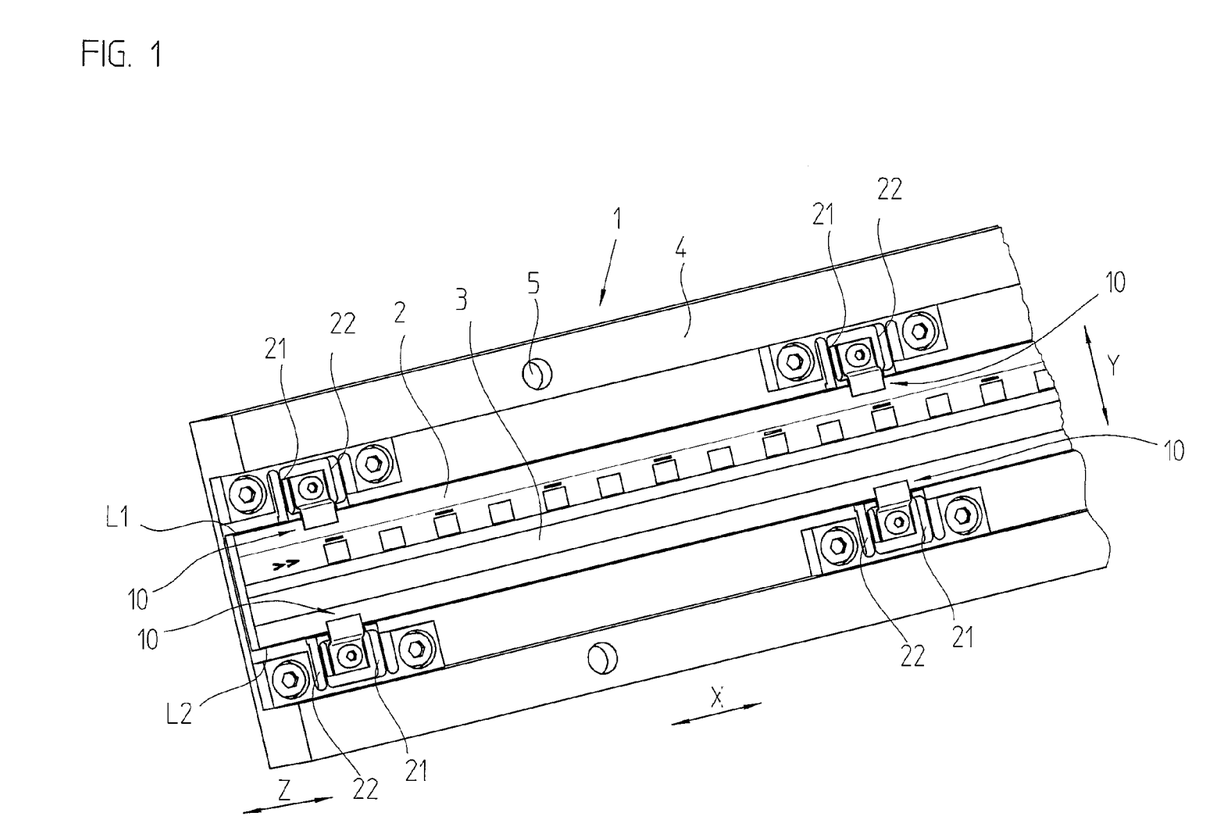
FIG. 1 is a perspective plan view of an embodiment of a holding device with a scale with a first embodiment of fastening elements and a first embodiment of solid body links in accordance with the present invention.
Figure 2:
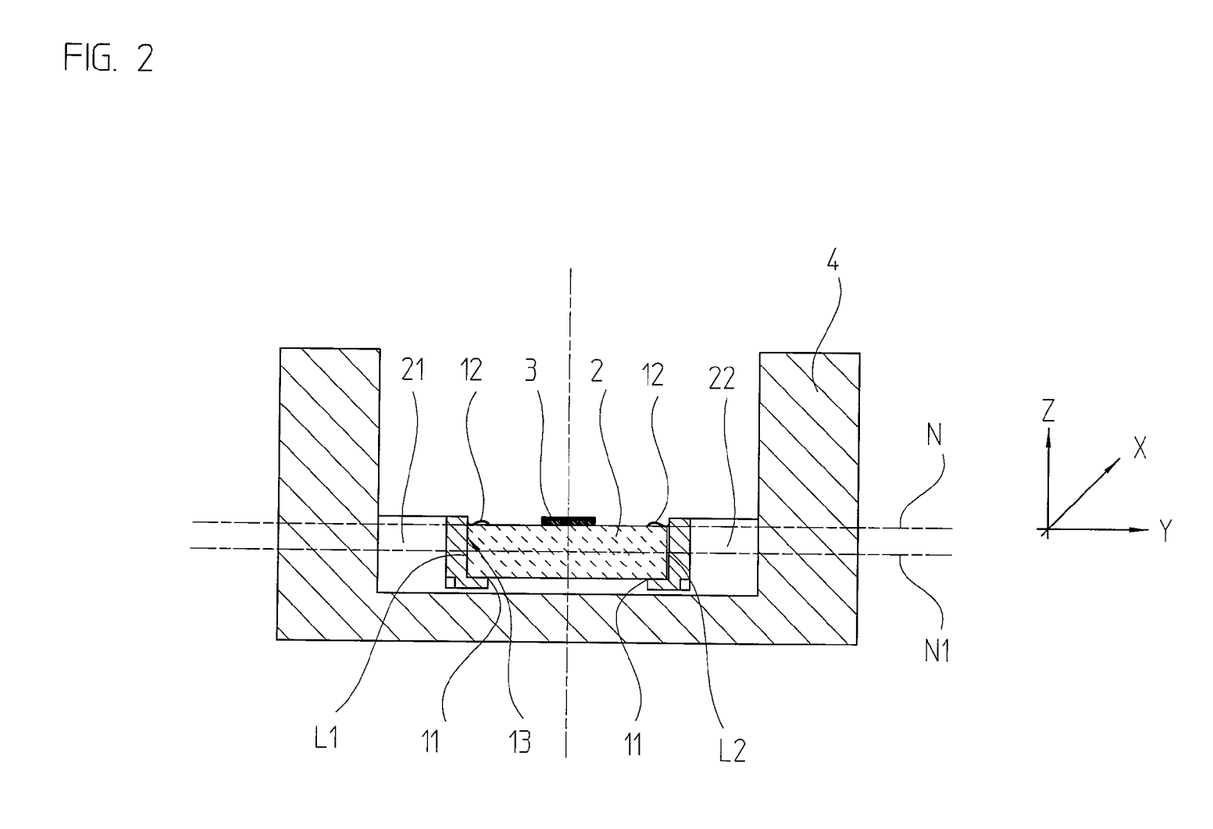
FIG. 2 is a cross section through the holding device in accordance with FIG. 1.
Figure 3:
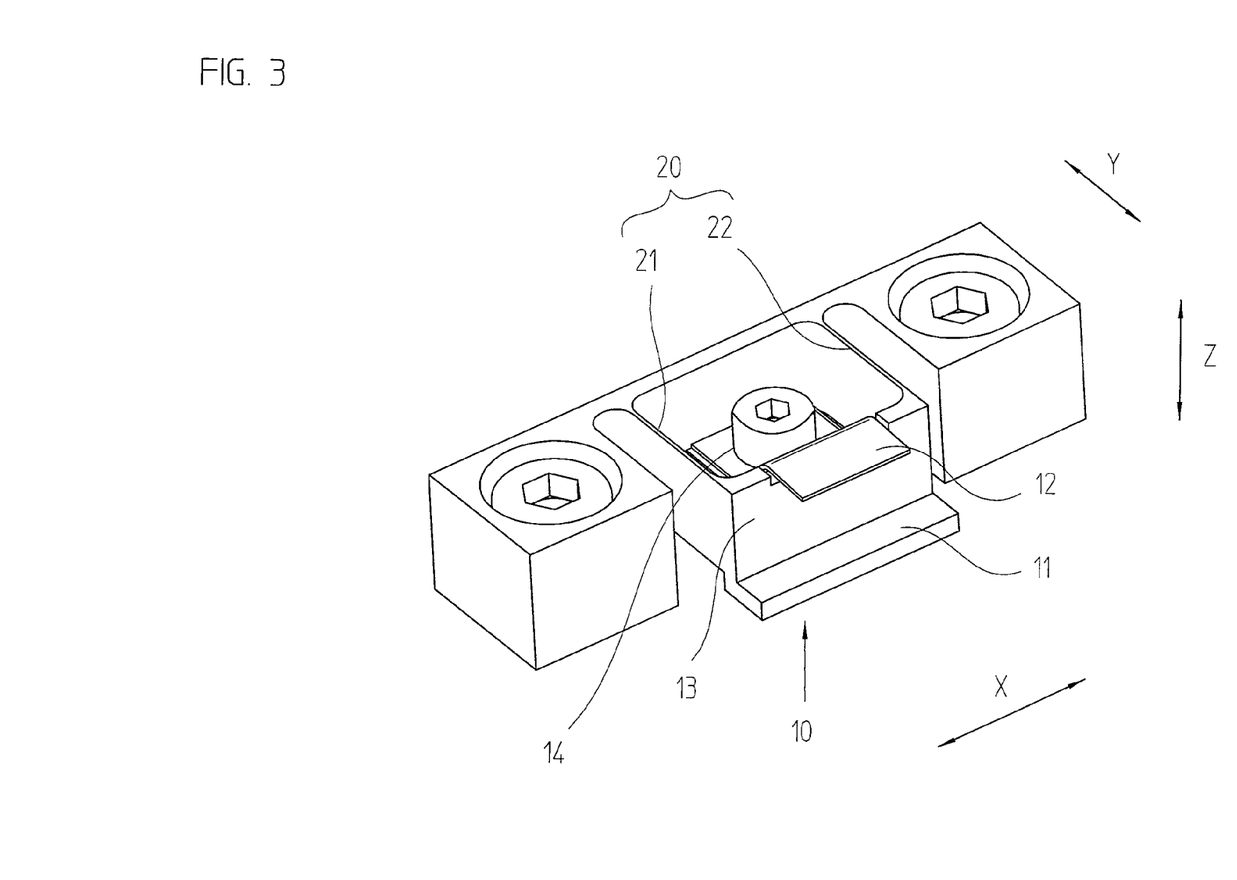
FIG. 3 is an enlarged representation of a fastening element of the holding device in accordance with FIG. 1.

A first exemplary embodiment of the present invention with a first design of a holding device, a first design of fastening elements and a first arrangement of solid body links is represented in detail in FIGS. 1 to 3. The scale 2 maintained in a holding device 1 is made of a material having a very low coefficient of expansion close to zero, in particular of a glass-ceramic material, silicon or silicon carbide. The scale 2, rectangular in cross section, has an incremental measuring graduation on its top, including an optically scannable line grating with a graduation period in the sub-micrometer range, for example 512 nm. The measuring graduation includes a reflecting phase grid or of reflecting and non-reflecting areas alternatingly arranged in the measuring direction X which, for generating position-dependent electrical scanning signals in the longitudinal direction X of the scale 2, are scanned by a non-represented photo-electrical scanning unit. Alternatively or additionally, the measuring graduation can have an absolute coding.

The holding device 1 includes a support body 4 which is used for fastening the scale 2 to a machine element whose position is intended to be measured. This fastening takes place, for example, by screws, for which purpose bores 5 have been cut into the support body 4. The holding element 1 furthermore includes fastening elements 10, with which the scale 2 is connected to the support body 4. The holding device moreover has solid body links 20 for seating the fastening elements 10, movable in the measuring direction X, on the support body 4.

The support body 4 is made of metal, in particular aluminum, and therefore has a different expansion behavior in case of temperature changes than the scale 2. So that the relative movements between the support body 4 and the scale 2 occurring during temperature changes do not cause any constraining forces, and therefore expansions, as well as deformation of the scale 2 resulting therefrom, the scale 2 is maintained on the support body 4 so that it can be deflected in the measuring direction X. For this purpose, solid body links 20 with fastening elements 10 are arranged on both longitudinal sides L1, L2 of the scale 2. These solid body links 20 with the fastening elements 10 at respectively one longitudinal side L1 or L2 of the scale 2 are arranged spaced apart from each other in the measuring direction X, and a solid body link 20 with the fastening element 10 on a longitudinal side L1 of the scale 2 is respectively arranged opposite a solid body link 20 with a fastening element 10 on the other longitudinal side L2 of the scale 2. Thus, the solid body links 20 with the fastening elements 10 on one longitudinal side L1 of the scale 2 are arranged symmetrically with respect to the solid body links 20 with the fastening elements 10 on the oppositely located longitudinal side L2 of the scale 2.

A solid body link 20 is arranged between respectively one fastening element 10 and the support body 4, by which the fastening element 10 is maintained on the support body 4 so that it can be deflected in the measuring direction X. The solid body link 20 and the fastening element 10 will be explained in greater detail by FIG. 3.

Each fastening element 10 is designed as a clamping element for non-positively holding (i.e., fixation with the transmission of power) the scale 2. It has a support 11 for the scale 2, as well as a counter-element in the form of a bending spring 12 for resiliently pressing the scale 2 onto this support 11. The fastening element 10 furthermore has a stop 13 extending perpendicularly with respect to the support 11 and in the measuring direction X. This stop 13 is used for the simple alignment of the scale 2 parallel with respect to the measuring direction X in that the scale 2 is placed with its longitudinal sides L1 extending in the measuring direction against the stop 13 arranged on this longitudinal side L1. As can be seen from the sectional representation in FIG. 2, with its left side L1 the scale 2 is in contact with the stops 13 of the fastening elements 10 arranged on the left side. In order to prevent an overly small gap between the scale 2 and stops 13 from forming, it is advantageous in connection with this example that the oppositely located longitudinal side L2 of the scale 2 is arranged spaced apart with slight play from the stops 13 of the fastening elements 10 assigned to the right longitudinal side L2.

It is advantageous that the support 11 and the stop 13 are embodied to be in one piece, i.e. together constitute a component. For mounting the scale 2, it is placed on the supports 11 of the fastening elements 10 arranged on both sides of the scale 2. The scale is aligned parallel with the measuring direction X in that one longitudinal side L1 is brought into contact with the stops 13 of the fastening elements 10 on this longitudinal side L1. For the clamping fastening of the scale 2 on the fastening element 10, respectively one bending spring 12 is placed on the scale 2 and, by a screw 14, is screwed together with a part constituting the stop 13 and the support 11. By this clamping of the scale 2 at the edge areas of its flat lower and upper surfaces located parallel opposite each other, the scale 2 is effectively fixed in its height, because the pressure exerted by the bending spring 12 on the scale 2 causes an equal counterforce acting from the support 11 on the scale 2. The force for clamping the scale 2 introduced by the bending spring 12 acts perpendicularly with respect to the measuring direction X and perpendicularly with respect to the lower and upper surfaces of the scale 2, i.e. in the Z-direction.

For compensating the different expansions of the scale 2 and the support body 4, the fastening bodies 10 are respectively seated via the solid body link 20 on the support body 4 so they can be deflected in the measuring direction X. This seating is a frictionless seating, so that the transfer of deformation-causing constraining forces to the scale 2 is prevented to at least a large extent. The solid body link 20 is at least one strip-shaped resilient bending link, wherein the at least one strip is arranged to extend perpendicularly with respect to the measuring direction X. The solid body link 20 can be deflected relatively easily in the measuring direction X, without exerting large restoring forces, but is as rigid as possible in directions perpendicularly thereto. In regard to manufacturing technology it is advantageous if the solid body link 20 is formed in one piece on the support 11 and the stop 13.

The solid body link 20 is made in an advantageous manner of two flexionally elastic strips 21, 22 arranged parallel in relation to each other. These two strips 21, 22 act as a parallelogram guidance device for the fastening element 10, and therefore for the scale 2. The two strips 21, 22 are respectively connected at one end with the part constituting the stop 13 and the support 11, and at the other end with the support body 4. This connection with the support body 4 can take place by the screw connection with the support body 4 represented in FIGS. 1 to 3, or in accordance with the variation represented in FIG. 4, in that the solid body link 20, i.e. the strips 21, 22, are formed in one piece on the rail-shaped support body 4.

The two strips 21, 22 and the stop 13 define a space for a space-saving arrangement of the screw 14.

In relation to the height of the scale 2 (direction Z), the solid body link 20, i.e. the strips 21, 22, are for example arranged symmetrically with respect to the center line (neutral plane N1 of the scale 2), i.e. in an advantageous manner on the level of the scale 2 respectively directly next to the longitudinal side L1 or L2 of the scale 2. This has the advantage that the force exerted on the scale during a deflection of the solid body links 20 acts in the neutral plane N1 of the scale 2 and therefore does not deform it. Moreover, no interfering transverse forces can result, because no asymmetrical bending moments act on the scale 2.

In connection with both exemplary embodiments explained above, the measuring graduation 3 of the scale 2 is arranged in the neutral plane N of the support body 4. This neutral plane N drawn in the cross-sectional view of FIG. 2, also called neutral plane, is the area (plane) of a body which does not experience a change in length in case of a deformation. The support body 4 is designed in an H- or U-shape to accomplish this.

Figure 4:
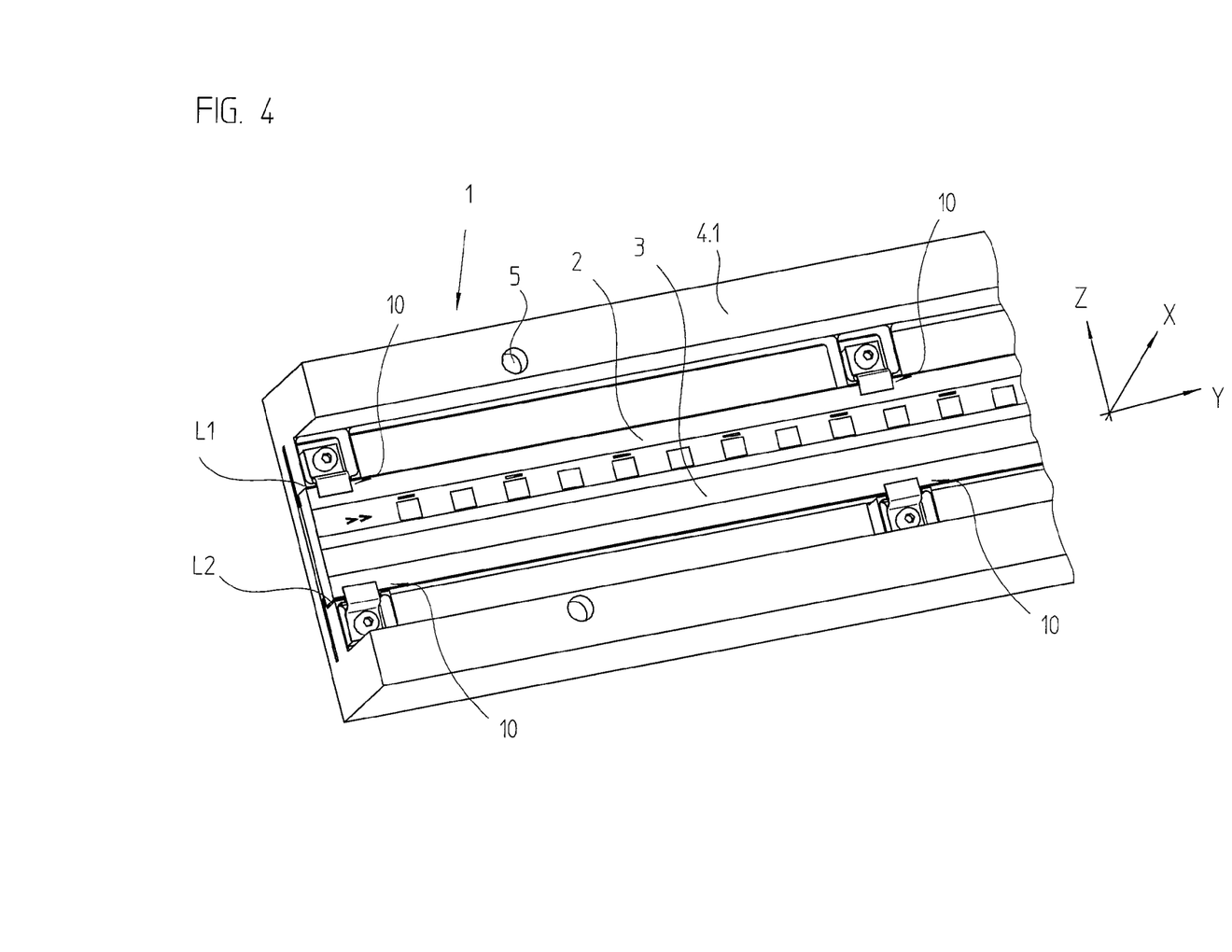
FIG. 4 is a perspective plan view of a second embodiment of a holding device with a scale with the first embodiment of fastening elements of FIG. 1 and the first embodiment of solid body links of FIG. 1 in accordance with the present invention.
Figure 5:
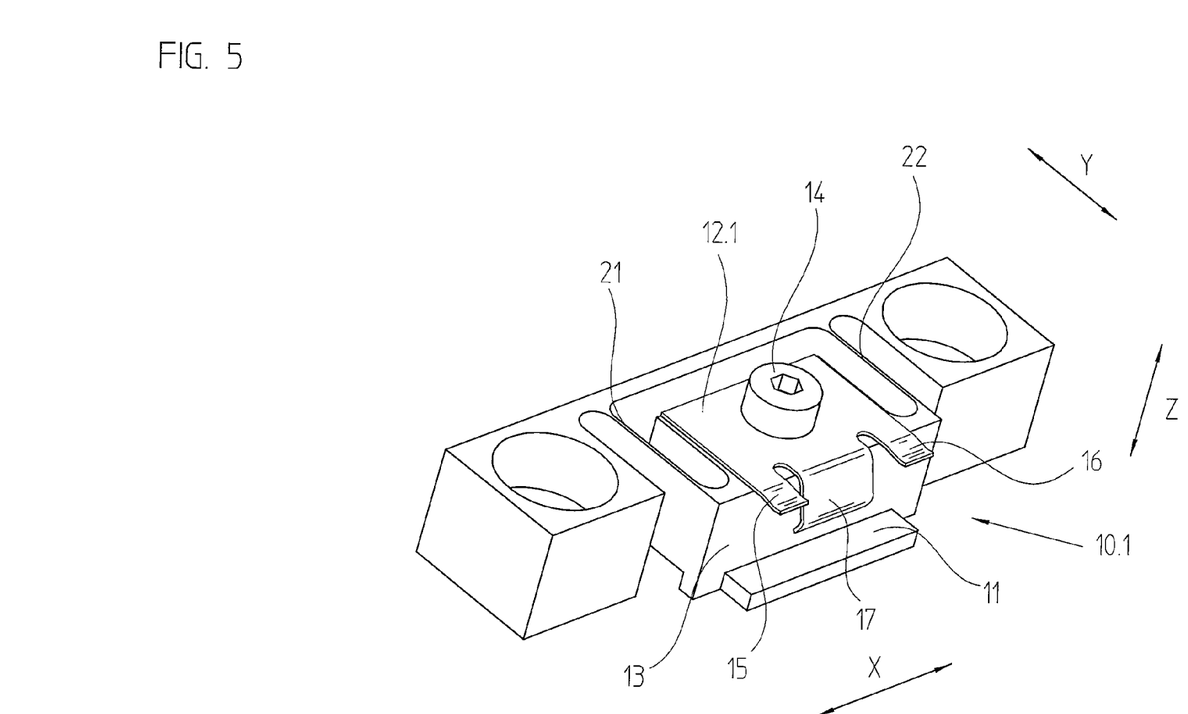
FIG. 5 is a second embodiment of a fastening element to be used with the first embodiment of solid body links of FIG. 1 in accordance with the present invention.

A second embodiment of fastening elements 10.1 is represented in FIG. 5. In an advantageous manner, the fastening elements 10 represented on the right longitudinal side L2 of the scale 2 in FIGS. 1, 2 and 4 are replaced by the fastening elements 10.1 represented in FIG. 5.

The basic construction corresponds to the fastening element 10 represented in FIG. 3, so that identical reference numerals are used for identical elements, and only the characteristics differing from the previously explained examples will be described in a supplementary manner in what follows. The essential difference is the design of the fastening element 10.1 for the non-positive holding of the scale 2. Again, the fastening element 10.1 has a support 11 for the scale 2, as well as a counter-element for pressing the scale 2 against this support 11. This counter-element is a bending spring 12.1 with two arms 15, 16, with which the scale 2 can be urged against the support 11, and a further, bent arm 17, which urges the scale 2 against the stop 13 of the oppositely arranged fastening element 10. By this it is assured that the scale 2 is aligned in the measuring direction X at the supports 11 and, with its longitudinal side L1, at the stops 13 of the oppositely arranged fastening element 10, and is maintained in this position under slight prestress of the arms 15, 16 and 17 of the bending spring 12.1. Different, thermally caused expansions between the scale 2 and the support body 4 in the X-direction are compensated by the solid body link 20, and in the Y-direction by the flexionally elastic arm 17. The fastening element 10.1 is, for example, a sheet metal element.

Figure 6:
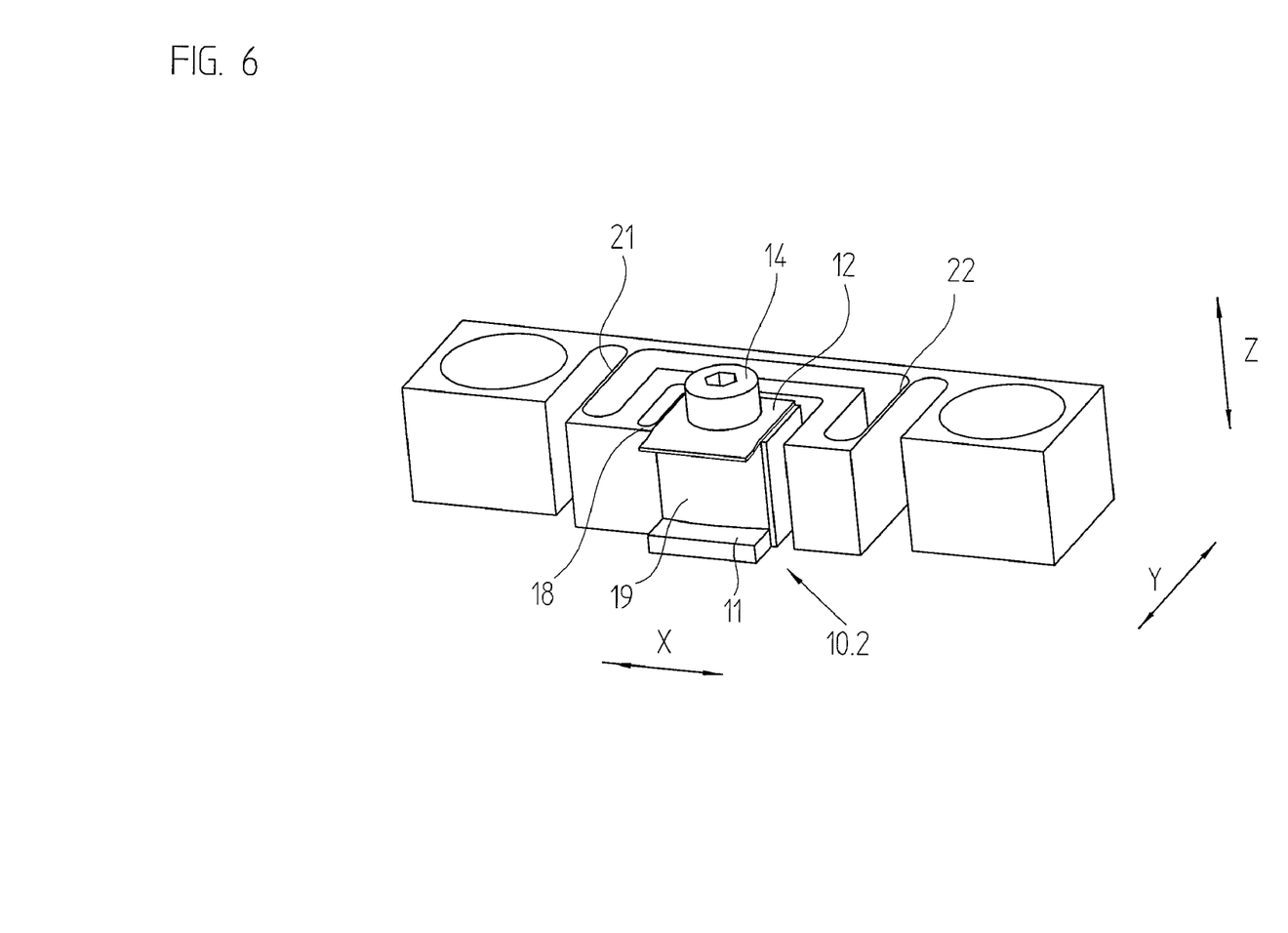
FIG. 6 is a third embodiment of a fastening element to be used with the first embodiment of solid body links of FIG. 1 in accordance with the present invention.

FIG. 6 shows a third embodiment of a fastening element 10.2. Here, too, the fastening elements 10 represented on the right longitudinal side L2 of the scale 2 in FIGS. 1, 2 and 4 should be replaced in an advantageous manner by the fastening elements 10.2 represented in FIG. 5 and explained in what follows.

The basic construction corresponds to the fastening element 10 represented in FIG. 3, so that here, too, identical reference numerals are used for identical elements, and only the differing characteristics will be described in a supplementary manner. Again, the fastening element 10.2 has a support 11 for the scale 2, as well as the counter-element in the form of the bending spring 12. The essential difference over the embodiment of the fastening element 10 is the arrangement of the stop face 19, which can now be resiliently deflected in the Y-direction via the solid body link 18. A fastening element 10.2, opposite of which a fastening element 10 in accordance with FIG. 3 is arranged with the interposition of the scale 2, urges the longitudinal side L1 of the scale 2 against the stop 12 of the fastening element 10. By this the scale 2 is clamped with a force component transversely to the measuring direction X, i.e. in the Y-direction, and is clampingly maintained. For the optimal exertion of this clamping force, the stop face 19 of the fastening element 10.2 is a raised, convex surface 19, which comes into contact with the longitudinal side L2 of the scale 2.

A fourth embodiment of a fastening element 10.3 is represented in FIGS. 7 to 10. Again, the fastening element 10.3 can be deflected in the Y-direction via a solid body link 18. A fastening element 10 in accordance with FIG. 3 with a support 11 and a stop 13 is arranged opposite the fastening element 10.3. In contrast to the previously described exemplary embodiments, the solid body links 20.1 are arranged in a space-saving manner in the support body 4.2 underneath the scale 2.1. This has the advantage that the length of the strips 21, 22 can be increased, so that the flexural strength is reduced, which can be very advantageous for certain applications. With a deflection of the fastening elements 10 and 10.3 in the X-direction because of different thermal expansion behaviors of the support body 4.2 and the scale 2.1 clamped between the fastening elements 10 and 10.3, the distance (Y-direction) between the stop faces 13 and 19 is reduced. This reduction is compensated by the yielding of the fastening element 10.3 in the Y-direction without impermissible forces acting on the scale 2.1.

Figure 7:
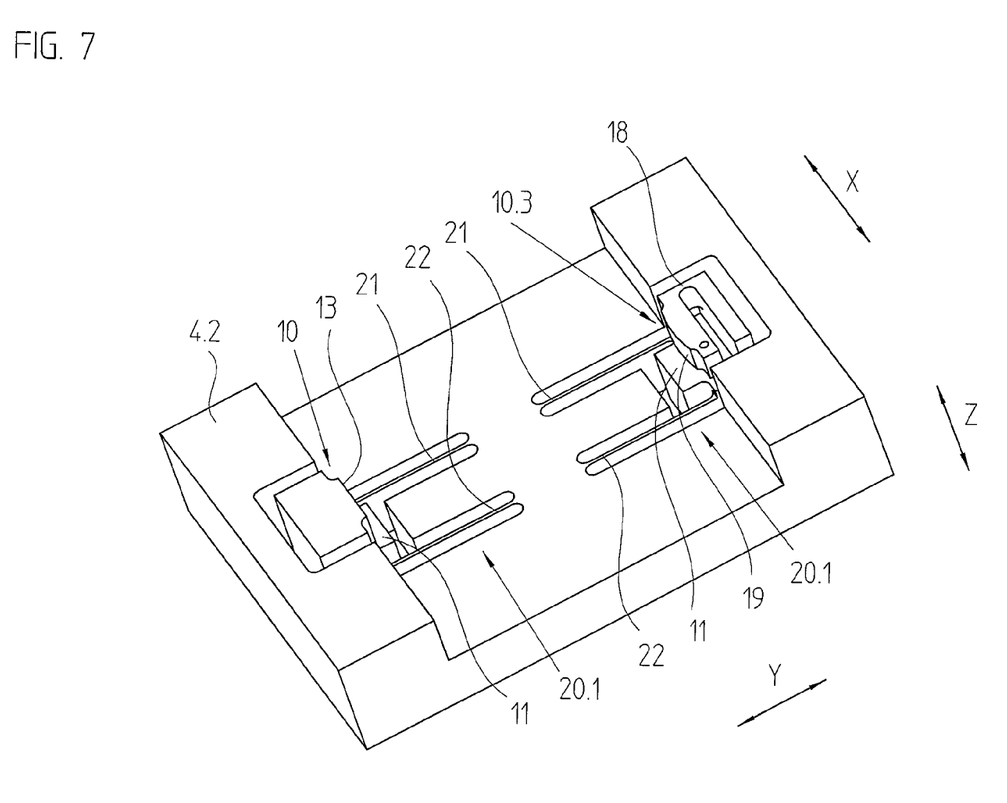
FIG. 7 is a fourth embodiment of a fastening element and a second embodiment of solid body links in accordance with the present invention.
Figure 8:
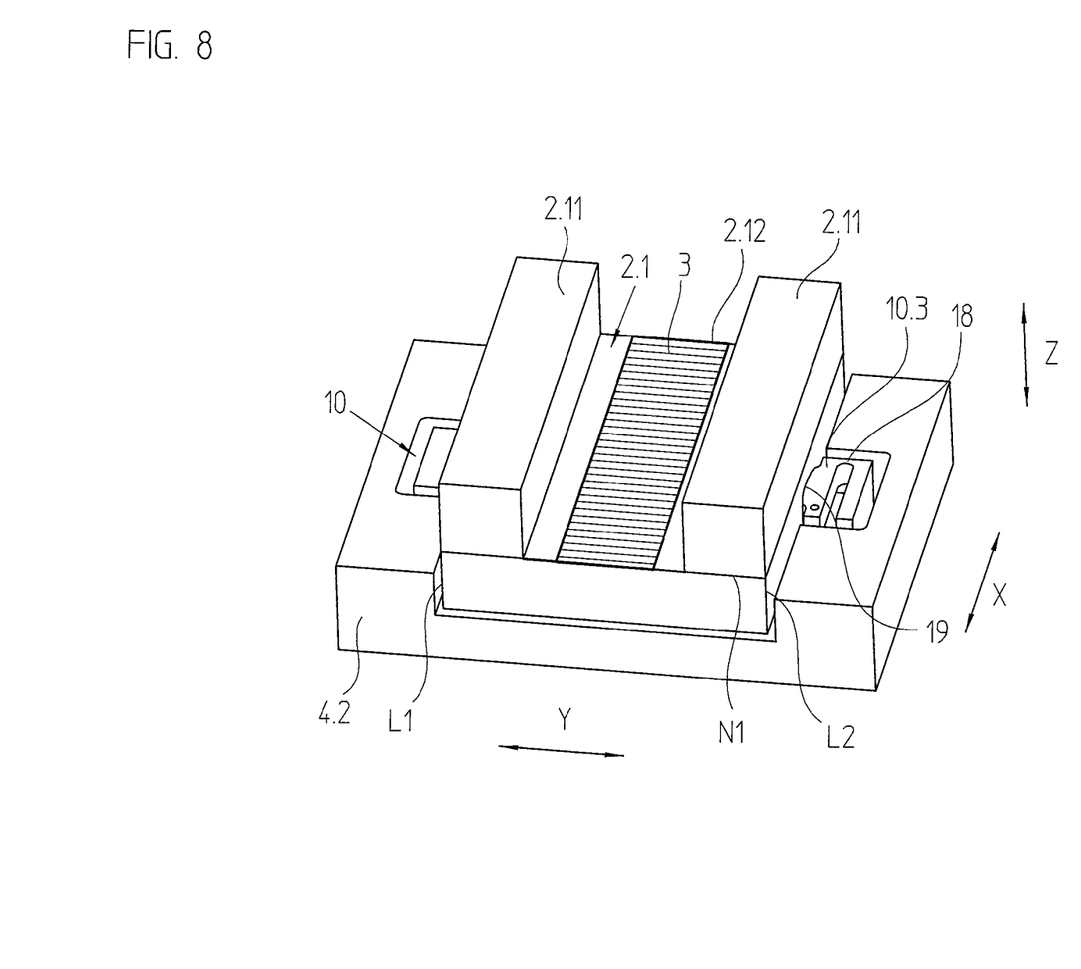
FIG. 8 shows the principle of the effect of the fastening element in accordance with FIG. 7 with a scale in accordance with the present invention.

The disadvantage connected with this of a possibility of a transfer of bending moments from the neutral plane N1 of the scale 2.1 to the scale 2.1, based on the arrangement of the strips 21, 22, which are arranged spaced apart in the Z-direction, can be compensated in that a U- or H-shaped scale 2.1 is employed and the measuring graduation 3 is arranged in the neutral plane N1 of this scale 2.1. This U- or H-shaped scale 2.1 can be embodied as a single part or, for simplifying the manufacture of this scale 2.1, the lateral elements 2.11 can be bonded to the base body 2.12 supporting the measuring graduation 3, in which case the measuring graduation 3 is applied to the base body 2.12 prior to the connection with the lateral elements 2.11.

Figure 9:
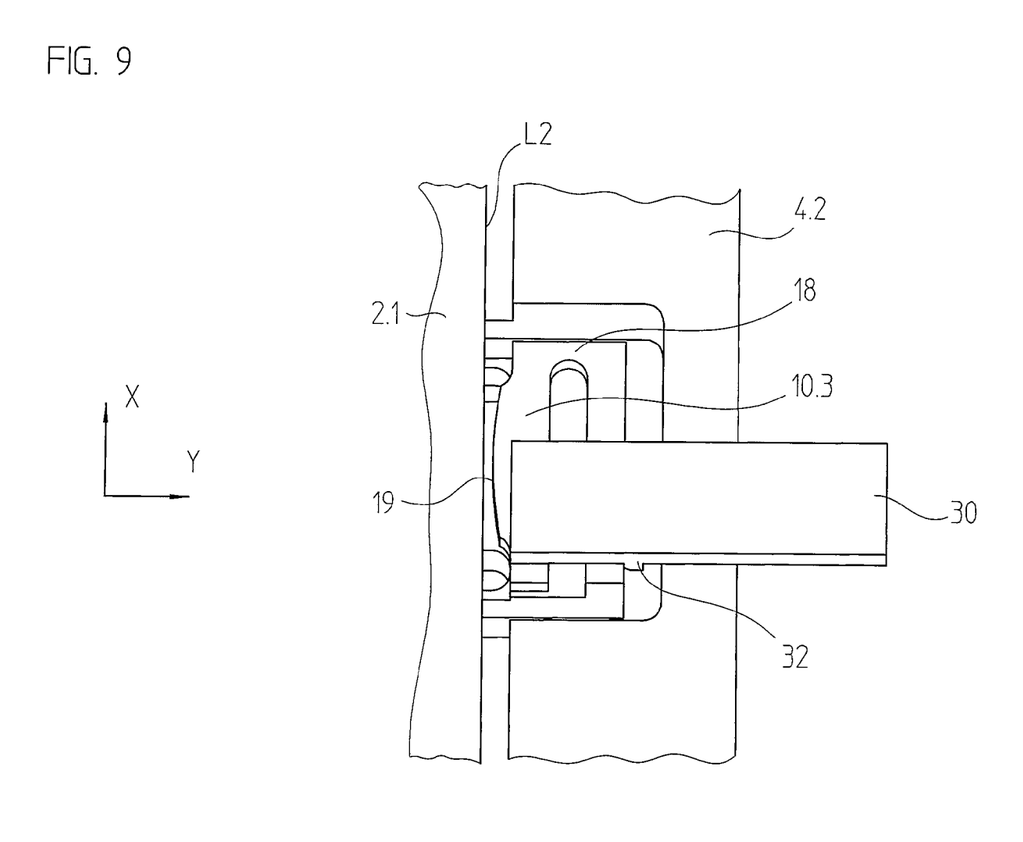
FIG. 9 shows the fourth embodiment of a fastening element in accordance with FIG. 7 with an embodiment of a mounting device in a first mounting position in accordance with the present invention.
Figure 10:
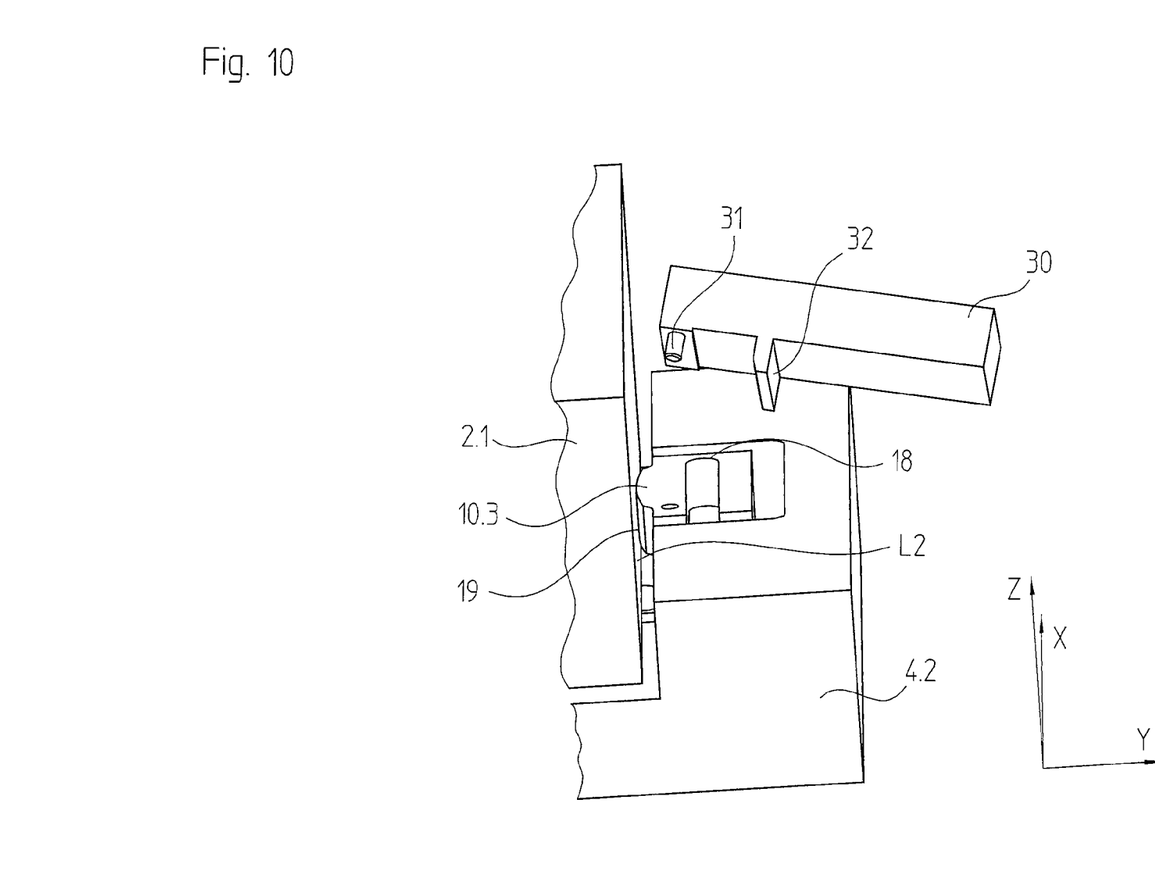
FIG. 10 shows the fastening element in accordance with FIG. 9 in a second mounting position.

A possibility of how the mounting of the scale 2.1 can be made easier is represented in FIGS. 9 and 10. A mounting arrangement 30 is provided for increasing the free space between two respectively oppositely located fastening elements 10 and 10.3. By the mounting arrangement 30, the stop face 19 of the fastening element 10.3 is brought into a position in which the solid body link 18 is deflected in a prestressed manner, and the concave stop face 19 is spaced apart from the scale 2, so that the scale 2 can be inserted between the two oppositely located fastening elements 10 and 10.3. After removing the mounting arrangement 30, the convex stop face 19 of the fastening element 10.3 springs back into a second position and clampingly holds the scale 2.1, as represented in FIG. 10. To this end, the mounting arrangement 30 has protrusions 31, 32, by which it cooperates with the fastening element 10.3 by a positive connection.

In connection with the embodiment of FIGS. 7 to 10 it is also possible in a non-represented manner to additionally provide a bending spring 12 as the counter-element in accordance with FIGS. 3 to 6.

In place of the above described combination of fastening elements 10 at the longitudinal side L1 and the opposite located fastening elements 10.1 or 10.2 or 10.3 at the longitudinal side L2, it is also possible to employ other combinations. Thus, fastening elements 10.1 or 10.2 or 10.3 can be used on both longitudinal sides L1 and L2.

In the above described particularly advantageous embodiments the scale is clampingly fastened on the holding device. This has the advantage that the scale can be combined with the holding device by the user later, after mounting the holding device on a machine (machine tool or measuring machine), and the scale can be exchanged. If that is not required, this non-positive connection can also be replaced, or supplemented, by gluing or another material-to-material connection.

Figure 11:
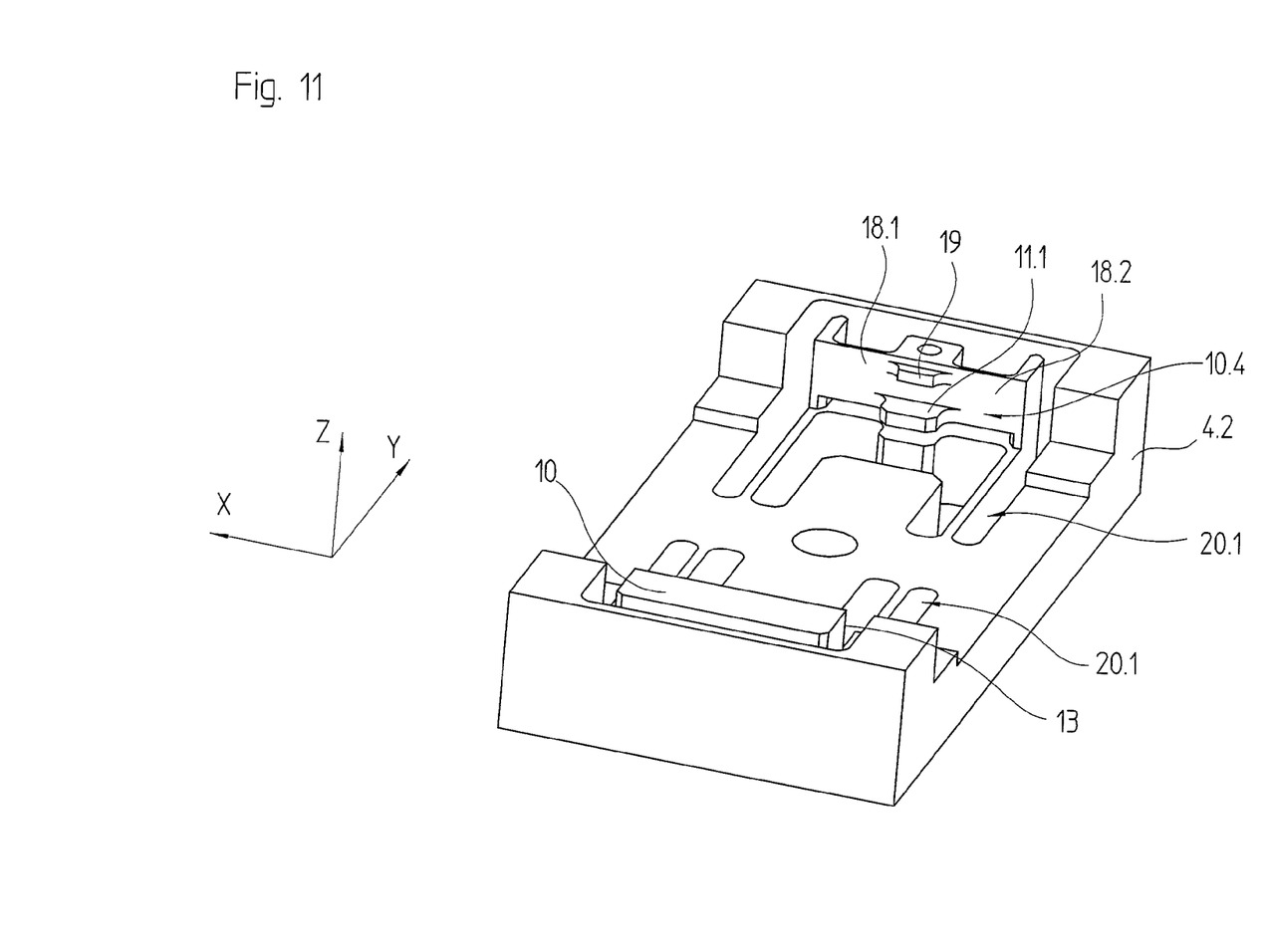
FIG. 11 shows a fifth embodiment of a fastening element with the second embodiment of the solid body links of FIG. 7 in accordance with the present invention.

In accordance with the above mentioned examples, the deflecting ability of at least one of respectively two oppositely arranged stop faces 13 and 17, or 13 and 19 is assured in that the stop face 17, 19 is arranged, movable relative to the support 11 in the Y-direction, on the solid body link 20, 20.1. Alternatively to this it is possible for the entire fastening element 10, 10.1, 10.2, 10.3, together with the associated stop faces 13, 17, 19, as well as with the support 11 and the counter-element (bending spring 12, arms 15, 16), to be held on the solid body link 20. 20.1, so it can be deflected in the Y-direction. An example of this is represented in FIG. 11. In contrast to the example represented in FIG. 7, here the fastening element 10.4, arranged at the end of the solid body link 20.1 and having the stop 19 and the support 11.1, can be deflected in the Y-direction. This deflecting ability is designed in such a way that, in case of a Y-movement, the support 11.1 and the stop 19 are not shifted in the X-direction, so that no constraining forces are exerted on the scale 2. For this purpose, the support 11.1 and the stop 19 are fastened on the solid body link 20.1 via symmetrically arranged expansion elements 18.1 and 18.2. The expansion elements 18.1, 18.2 arranged on both sides of the support 11.1 and the stop 19 extend in the form of thin strips in the X-direction.

Figure 12:
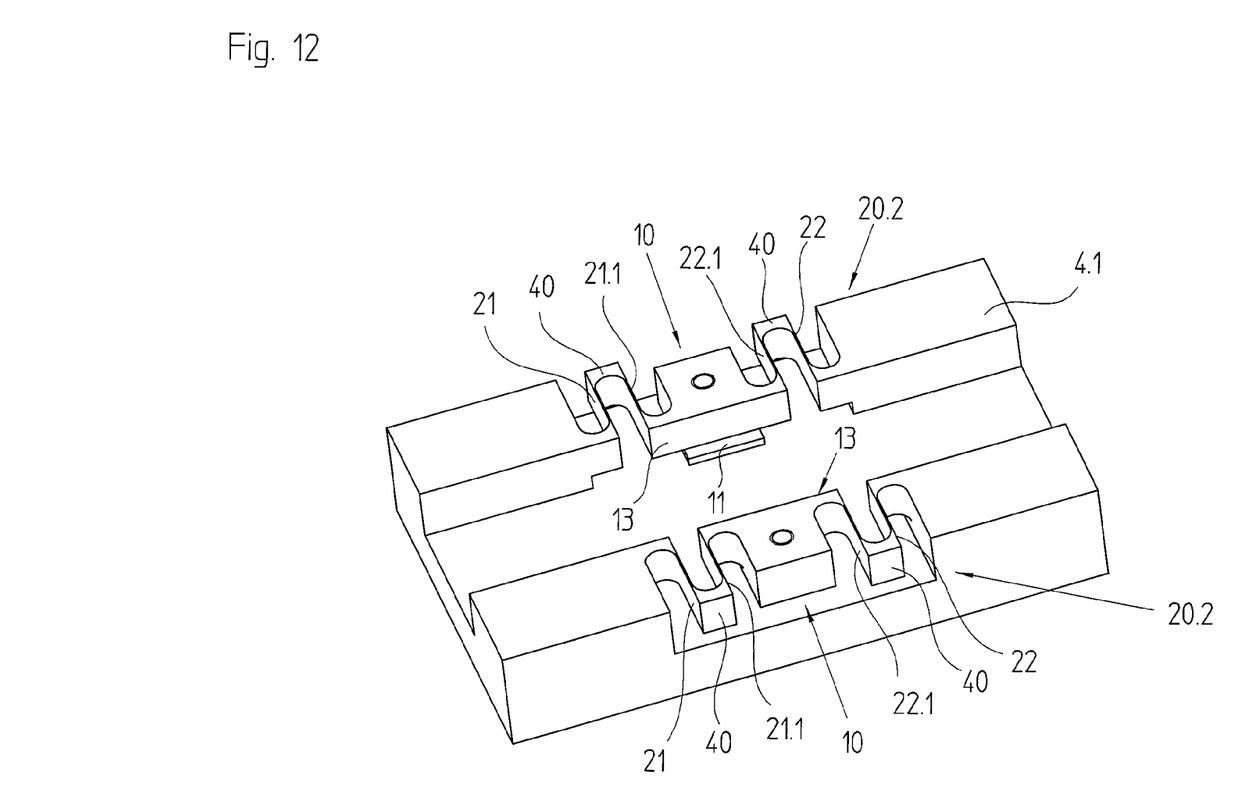
FIG. 12 is a third embodiment of solid body links in accordance with the present invention.

The solid body links 20, 20.1 described up to now respectively included two parallel arranged strips 21 and 22. The shifting of the stops 13, 17, 19 in the Y-direction, resulting from a deflection of the strips 21, 22 in the X-direction because of the shortening of the strips 21, 22, can be completely compensated by employing double-spring arrangements, in particular double-spring parallelogram devices. Such an arrangement is represented in FIG. 12. The basic construction corresponds to the arrangement in accordance with FIG. 4, so that again only the differences will be described in detail. The representation is without the bending spring 12. The solid body links 20.2, which are located oppositely each other perpendicularly with respect to the measuring direction X, are advantageously embodied in one piece in the support body 4.1. Each strip 21, 22 of the embodiments explained so far is complemented by a further strip 21.1, 22.1, wherein the respective two strips 21, 21.1, as well as 22, 22.1, are connected with each other via a coupling device 40, which is freely movable in the Y-direction. A shortening of the strips 21, 21.1, 22, 22.1 resulting in the course of a deflection is compensated by the coupling device 40 without having an effect on the fastening element 10. The two coupling devices 40 of a solid body link 20.2 can also respectively be rigidly connected with each other.

For forming a thermal fixed point and for fixing the scale 2, or 2.1 in place in a particularly vibration-free manner on the support body 4, 4.1 or 4.2, the scale 2, or 2.1 can be immovably fixed in place in a position in the measuring direction X. A fixation in place in the center of the measuring length of the scale 2, or 2.1 is particularly advantageous, because it is possible in this way to achieve a minimization of the longitudinal expansion in case of temperature changes or accelerations.

Figure 13:
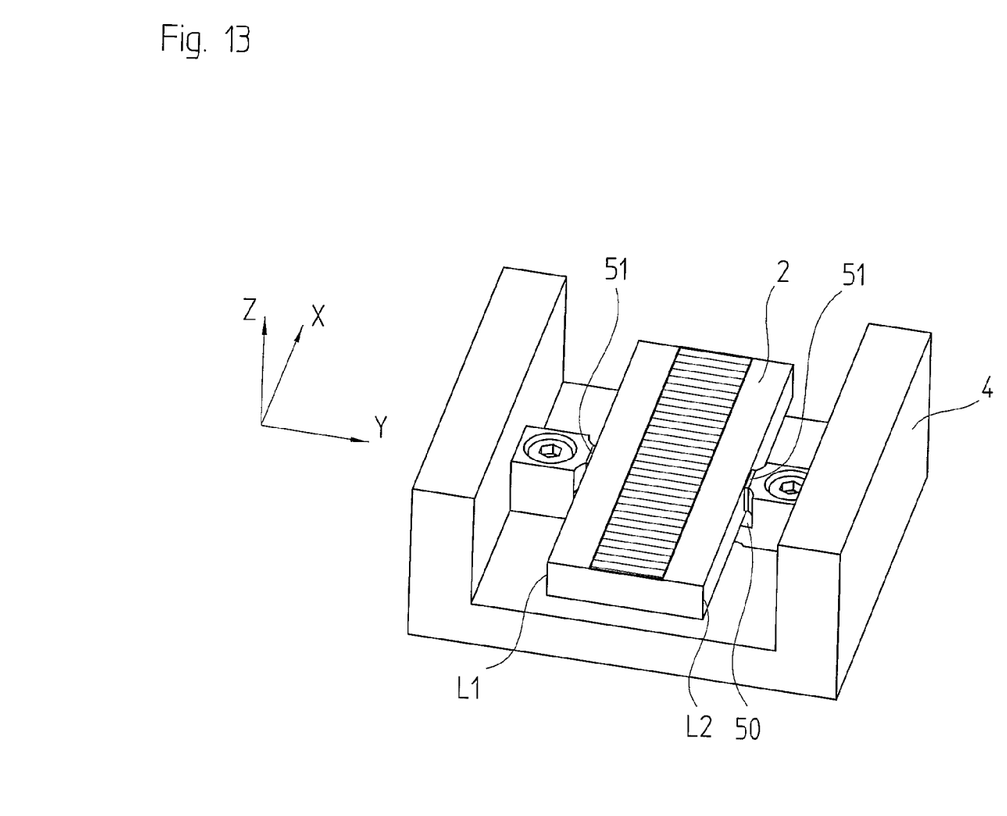
FIG. 13 shows a design of a thermal fixed point.

An embodiment of such a fixed point in the form of a piece of the support body 4 and a piece of the scale 2 is schematically represented in FIG. 13. Here, both sides of the scale 2 rest on supports 50—comparable to the supports 11—at the center of the entire measuring length (X-direction). In oppositely located areas of its longitudinal sides L1 and L2, the scale 2 is connected with the support body 4 via a rigid glue connection 51. This rigid connection 51 between the scale 2 and the support body 4 preferably also lies in the neutral plane N1 of the scale 2, or symmetrically in relation to the neutral plane N1.

The foregoing description is provided to illustrate the invention, and is not to be construed as a limitation. Numerous additions, substitutions and other changes can be made to the invention without departing from its scope as set forth in the appended claims.

We claim:

1. A holding device for a scale, comprising:
a support body;
a first solid body link as a connection between a first longitudinal side of a scale and said support body, wherein via said first solid body link said scale can be seated and shiftable in a measuring direction on said support body by deflection of said first body link; and
a second solid body link as a connection between a second longitudinal side of said scale and said support body, wherein via said second solid body link said scale can be seated and shiftable in said measuring direction on said support body by deflection of said second solid body link, wherein said second longitudinal side and said first longitudinal side are arranged opposite each other, wherein said first solid body link comprises a shiftable first fastening element on said first longitudinal side of said scale, via which a respective connection with said scale can be established and said second solid body link comprises a second fastening element that is on said second longitudinal side of said scale and is arranged opposite said shiftable first fastening element; and
wherein said shiftable first fastening element is shiftable in said measuring direction via deflection of said first solid body link, and said shiftable first fastening element is embodied for non-positive holding of said scale, and said shiftable first fastening element comprises a support for said scale and a counter-element for pressing said scale against said support; and
wherein said shiftable first fastening element comprises a stop, against which said scale can be placed with said first longitudinal side extending in said measuring direction; and wherein said first solid body link comprises at least two parallel strips extending perpendicularly to said measuring direction, and each of said at least two parallel strips is attached to said stop.

2. The holding device in accordance with claim 1, wherein said first solid body link is formed in one piece on said support body.

3. The holding device in accordance with claim 1, wherein said first solid body link is arranged next to said scale in a plane of said scale.

4. The holding device in accordance with claim 1, wherein said first solid body link is arranged in a plane underneath said scale.

5. The holding device in accordance with claim 1, wherein said counter-element comprises a bending spring.

6. The holding device in accordance with claim 5, wherein said second solid body link comprises a second fastening element that is arranged opposite said shiftable first fastening element on said first and second longitudinal sides of said scale; and
wherein said bending spring comprises:
a first arm, by which said scale can be urged against said support; and
a second arm, by which said scale can be urged in a direction toward said second fastening element.

7. The holding device in accordance with claim 1, wherein said shiftable first fastening element clamps said scale with a force component transversely to said measuring direction.

8. The holding device in accordance with claim 1, wherein said second fastening element is embodied in such a way that it urges said scale in a direction of said stop of said first fastening element.

9. The holding device in accordance with claim 1, wherein a stop face of said second fastening element can be moved transversely in relation to said measuring direction via a third solid body link.

10. The holding device in accordance with claim 9, wherein said stop face of said second fastening element can be brought into a first position in which said third solid body link is deflected in a prestressed manner in order to insert said scale between said shiftable first fastening element and said second fastening element, and said stop face springs back into a second position in which it clampingly holds said scale.

11. The holding device in accordance with claim 1, wherein a measuring graduation of said scale is arranged in a neutral plane of said support body.

12. The holding device in accordance with claim 1, wherein a measuring graduation of said scale is arranged in a neutral plane of said scale.

13. A measuring device, comprising:
a scale;
a holding device for holding said scale, said holding device comprising:
a support body;
a first solid body link as a connection between a first longitudinal side of said scale and said support body, wherein via said first solid body link said scale is seated and shiftable in a measuring direction on said support body by deflection of said first solid body link; and
a second solid body link as a connection between a second longitudinal side of said scale and said support body, wherein via said second solid body link said scale is seated and shiftable in said measuring direction on said support body by deflection of said second solid body link, wherein said second longitudinal side and said first longitudinal side are arranged opposite each other, wherein said first solid body link comprises a shiftable first fastening element, via which a respective connection with said scale is established and wherein said second solid body link comprises a second fastening element that is arranged opposite said shiftable first fastening element; and wherein said shiftable first fastening element is shiftable in said measuring direction via deflection of said first solid body link, and said shiftable first fastening element is embodied for non-positive holding of said scale, and said shiftable first fastening element comprises a support for said scale and a counter-element for pressing said scale against said support;
wherein said shiftable first fastening element comprises a stop, against which said scale is placed with said first longitudinal side extending in said measuring direction; and
wherein said first solid body link comprises at least two parallel strips extending perpendicularly to said measuring direction, and each of said at least two parallel strips is attached to said stop.

14. The measuring device in accordance with claim 13, wherein said first solid body link is formed in one piece on said support body.

15. The measuring device in accordance with claim 13, wherein said first solid body link is arranged next to said scale in a plane of said scale.

16. The measuring device in accordance with claim 13, wherein said first solid body link is arranged in a plane underneath said scale.

17. The measuring device in accordance with claim 13, wherein said counter-element comprises a bending spring.

18. The measuring device in accordance with claim 17, wherein said bending spring comprises:
a first arm, by which said scale can be urged against said support; and
a second arm, by which said scale can be urged in a direction toward said second fastening element.

19. The measuring device in accordance with claim 13, wherein said shiftable first fastening element clamps said scale with a force component transversely to said measuring direction.

20. The measuring device in accordance with claim 19, wherein said shiftable first fastening element is embodied in such a way that it exerts a clamping force on said scale directed in a direction of said second fastening element.

21. The measuring device in accordance with claim 13, wherein said second fastening element is embodied in such a way that it urges said scale in a direction of said stop of said first fastening element.

22. The measuring device in accordance with claim 13, wherein a stop face of said second fastening element can be moved transversely in relation to said measuring direction via a third solid body link.

23. The measuring device in accordance with claim 22, wherein said stop face of said second fastening element can be brought into a position in which said third solid body link is deflected in a prestressed manner in order to insert said scale between said shiftable first fastening element and said second fastening element, and said stop face springs back into a second position in which it clampingly holds said scale.

24. The measuring device in accordance with claim 13, wherein a measuring graduation of said scale is arranged in a neutral plane of said support body.

25. The measuring device in accordance with claim 13, wherein a measuring graduation of said scale is arranged in a neutral plane of said scale.

26. A position measuring arrangement, comprising:
- a scale comprising a first longitudinal side and a second longitudinal side opposite to said first longitudinal side; and
- a holder that holds said scale, said holder comprising:
  - a support body;
  - a first set of solid body links as a connection between said first longitudinal side and said support body, wherein via said first set of solid body links said scale is seated and shiftable in a measuring direction on said support body by deflection of said first set of solid body links; wherein each of said first set of solid body links has a fastening element associated therewith and wherein one of said first set of solid body links is arranged between one of said fastening elements and said support body so that said one of said fastening elements can be deflected in said measuring direction;
  - a second set of solid body links which can be deflected in said measuring direction as a connection between said second longitudinal side and said support body, wherein via said second set of solid body links said scale is seated and shiftable in said measuring direction on said support body by deflection of said second set of solid body links; and
  - wherein said one of said fastening elements is embodied for the non-positive holding of the scale in that it comprises a support for said scale and a counter-element for pressing said scale against said support; and
  - wherein said one of said fastening elements comprises a stop, against which said scale can be placed with said first longitudinal side extending in said measuring direction; and
  - wherein one of said set of solid body links comprises at least two parallel strips extending perpendicularly to said measuring direction, and each of said at least two parallel strips is attached to said stop.

27. A position measuring arrangement, comprising:
- a scale;
- a holder that holds said scale, wherein said holder comprises:
  - a support body; and
  - a first fastening element and a second fastening element that is spaced from said first fastening element in a measuring direction X, wherein said first fastening element and said second fastening element connects said scale to said support body;
  - a solid body link arranged between said first fastening element and said support body, wherein said solid body link allows said first fastening element to be deflected in said measuring direction; and
  - wherein said first fastening element is embodied for the non-positive holding of said scale in that said first fastening element comprises a support for said scale and a counter-element for pressing said scale against said support; and
- wherein said first fastening element comprises a stop, against which said scale can be placed with its first longitudinal side extending in said measuring direction; and
- wherein said solid body link comprises at least two parallel strips extending perpendicularly to said measuring direction, and each of said at least two parallel strips is attached to said stop.

* * * * *